United States Patent [19]

McGovern

[11] Patent Number: 6,011,329
[45] Date of Patent: Jan. 4, 2000

[54] ELECTRICAL CIRCUIT CYCLING CONTROLLER

[76] Inventor: Patrick T. McGovern, 870 Stony Point Rd., Castleton, N.Y. 12033

[21] Appl. No.: 09/143,697

[22] Filed: Aug. 28, 1998

[51] Int. Cl.[7] .................................................. H01H 3/34
[52] U.S. Cl. ........................ 307/141.4; 315/193; 315/320
[58] Field of Search .............................. 307/31, 38, 39, 307/41, 112, 116, 125, 126, 130, 131, 141, 141.4; 315/192, 193, 195, 210, 312, 313, 320–323; 327/250, 252, 392, 393; 340/527; 361/75, 83, 89, 94, 195

[56] References Cited

U.S. PATENT DOCUMENTS

| | | | |
|---|---|---|---|
| 1,066,204 | 7/1913 | Greene et al. . | |
| 3,119,021 | 1/1964 | Podell et al. | 307/39 |
| 3,188,503 | 6/1965 | Hendry | 307/141 |
| 3,244,912 | 4/1966 | Hauser | 307/141 |
| 3,267,303 | 8/1966 | Meyer et al. | 307/141 |
| 3,366,800 | 1/1968 | Everard | 307/117 |
| 3,809,918 | 5/1974 | Okubo et al. | 307/41 |
| 3,973,135 | 8/1976 | Scott | 307/141 |
| 3,984,699 | 10/1976 | Bailey | 307/41 |
| 4,071,721 | 1/1978 | Murata et al. | 200/38 |
| 4,172,221 | 10/1979 | Iizuka | 250/214 |
| 4,180,744 | 12/1979 | Helwig, Jr. | 307/39 |
| 4,209,728 | 6/1980 | Membreno | 315/159 |
| 4,362,970 | 12/1982 | Grady | 315/159 |
| 4,433,249 | 2/1984 | Long | 307/141 |
| 4,719,364 | 1/1988 | Pequet et al. | 307/141 |
| 4,733,103 | 3/1988 | Itoh et al. | 307/117 |
| 4,769,555 | 9/1988 | Pequet et al. | 307/141 |
| 4,777,379 | 10/1988 | Young | 307/141 |
| 5,384,490 | 1/1995 | Swartz, Jr. | 307/41 |
| 5,424,903 | 6/1995 | Schreiber | 307/41 |
| 5,430,598 | 7/1995 | Rodolfo et al. | 361/115 |
| 5,592,033 | 1/1997 | Gold | 307/117 |
| 5,612,582 | 3/1997 | Shichi et al. | 307/103 |
| 5,879,184 | 3/1999 | Lopez | 307/141 |

Primary Examiner—Jeffrey Gaffin
Assistant Examiner—Peter Zura
Attorney, Agent, or Firm—Heslin & Rothenberg, P.C.

[57] ABSTRACT

A time delay power controller has a power input for receiving alternating electrical power from an external source; a timer activation device connected in parallel to a one or more timers, each timer having an associated delay time and an output for delivering power after the delay time has elapsed and a plurality of contactors, with a first contactor coupled to the timer activation device and the remaining contactors coupled to the output of a respective timer. Each contactor is coupled to one or more associated circuits. The first contactor allows delivery of alternating electrical power to its associated circuits when the timer activation device is enabled and the remaining contactors allow delivery of alternating electrical power to their associated circuits when the respective timer's delay time has elapsed. The controller may be enclosed in a housing. The controller may be configured to sequentially power lighting circuits.

18 Claims, 1 Drawing Sheet

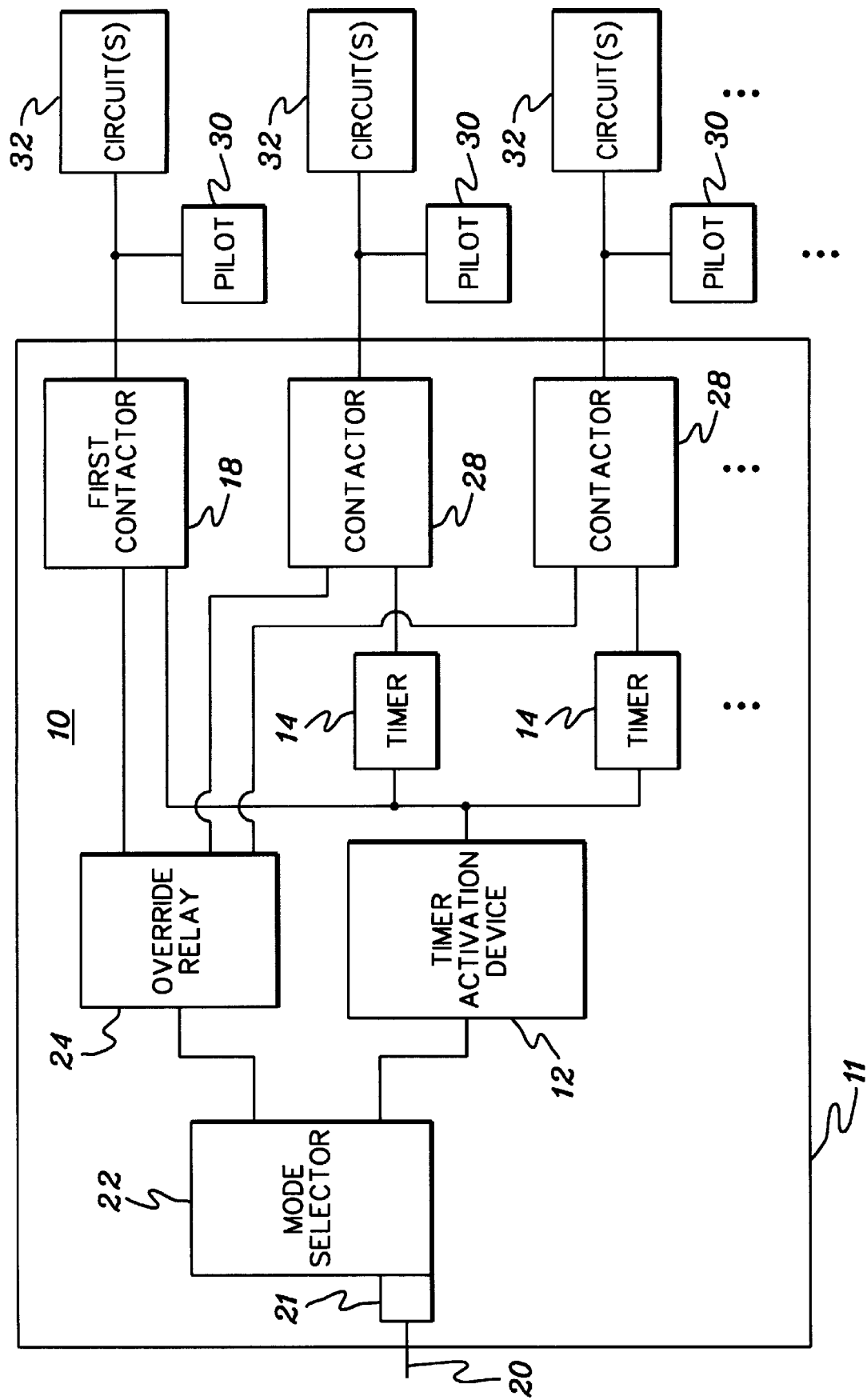

ELECTRICAL CIRCUIT CYCLING CONTROLLER

FIELD OF THE INVENTION

This invention relates to a circuit controller, and more particularly, to a controller which activates a group of circuits in a timed sequence.

BACKGROUND OF THE INVENTION

The pumps and surrounding environment at a modern gas station are illuminated by banks of high intensity discharge (HID) lamps, such as mercury vapor lamps, metal halide lamps, and high pressure lamps. These lamps have high operating power requirements in addition to a large instant power draw on start-up. Utilities charge a usage fee for electricity on a large start up. Consequently, it is very costly to operate the outdoor lighting at gas stations and similar retail establishments. When lights are left on during the day, or turned on before natural light is low, costs are further increased. Large (6'×7'), fully automatic systems which perform some of these functions are available. However, the programming required to set up such a system is a disadvantage. In addition, particularly in gas stations having only a booth for an attendant, a system of such a size is too large to be installed in the very limited amount of space available.

There is therefore a need for an automatic lighting controller which cycles in one or several circuits at a time instead of all the lighting circuits at once. There is also a need for an automatic system which turns on nighttime lighting and turns off the lights without the need for action by an attendant.

There is a further need for such a system which is very small in size and, further, which requires very simple programming and service.

SUMMARY OF THE INVENTION

The present invention meets all of these needs. It can operate without attendant activation. It minimizes costs for lights left on during the day. It additionally avoids the usage fee charged for the large instant power draw which occurs when all of the heavy outdoor lighting is turned on at once. It combines these advantages with a very small footprint (e.g. 2 foot×2 foot) so it may be installed even in the few tight spaces a gas station booth has.

The present invention provides a time delay power controller having a power input for receiving alternating electrical power from an external source; a timer activation device connected in parallel to one or more timers, each timer having an associated delay time and an output for delivering power after the delay time has elapsed; and a plurality of contactors, with a first contactor coupled to the timer activation device and the remaining contactors coupled to the output of a respective timer and each contactor coupled to one or more associated circuits, the first contactor allowing delivery of alternating electrical power to its associated circuits when the timer activation device is enabled and the remaining contactors allowing delivery of alternating electrical power to their associated circuits when the respective timer's delay time has elapsed. The timer activation device may be a switch, a timer or a photocell.

The time delay power controller of the present invention may also include a mode selector connected between the power input means and the timer activation device, and an override relay connected to the mode selector switch and to each contactor. The controller may further include a respective pilot light associated with the first contactor and with each timer. The first contactor allows delivery of alternating electrical power to its associated pilot light when the timer activation device is enabled, and the timers allow delivery of alternating electrical power to their associated pilot lights when each respective timer's delay time has elapsed. In a preferred embodiment, the controller is enclosed in a housing.

BRIEF DESCRIPTION OF THE DRAWINGS

FIG. 1 is a block diagram of a controller constructed in accordance with the present invention.

DETAILED DESCRIPTION

The controller of the present invention generally includes a power input for receiving alternating electrical power, a timer activation device, one or more timers, each having an adjustable time delay, and a plurality of contactors each coupled to one or more circuits. The controller functions to provide power to the circuits in a timed sequence. The apparatus is operative for controlling electrical equipment, such as outdoor lighting.

A preferred embodiment of the time delay power controller 10 of the present invention is depicted in FIG. 1. The components of the controller are preferably enclosed in a housing 11. The housing may be formed of a rigid material such as plastic or metal or a combination thereof. Preferably, the housing is impact- and weather-resistant. Weather-resistance is not necessary for indoor installation. An example of a suitable housing is a 24 inches long×24 inches wide ×10 inches deep panel box rated Nema 3R or Nema 4× by the National Electrical Manufacturers Association, and commonly available from electrical supply houses.

A power supply wire or cable 20 is connected from an external AC power source (not shown) at a conventional line voltage, e.g. 110 volts, to a power input 21 of a mode selector 22 of controller 10. The power supply may also be selected to provide 220 volt, 3 phase power or any other desired power. The mode selector allows a user to choose either automatic operation using timers or manual untimed activation when desired. Untimed activation may be required during servicing, for example. An example of a mode selector useful in the controller of the present invention is selector switch model number CR104PSG34B92, sold by General Electric Co.

When the mode selector is set to manual operation, an override relay 24 powers the circuits 32 through a plurality of contactors 18, 28, with no time delay. A contactor, or multi-pole relay, is a type of switch used for the automatic making and breaking of a circuit and designed for frequent use. Equivalent switching devices may also be employed in the controller. Contactors for use with heavy outdoor lighting must be rated as such. Exemplary contactors useful in the practice of the invention are model number CR353AB4AA1, sold by the General Electric Company. Similar contactors are available from the Square D Company.

The mode selector 22, when set to automatic operation, is coupled to a timer activation device 12, which turns on all timers simultaneously, to start the timed turn-on sequence of circuits. For timed manual operation, the timer activation device may be a switch. For automatic timed operation, the activation device may be a photocell or a timer. A timer starts the timing sequence at a predetermined time of day and turns off the power to the associated timers and contactors after the desired predetermined amount of time without action by an attendant. A photocell turns on the system when outdoor natural light is low, and turns off the system when outdoor natural light is high, and is unaffected by time changes from standard time to daylight-saving time. Despite these advantages, it may be desirable to use a timer instead of a photocell where it is difficult to tune the photocell to turn on lighting at the chosen set point.

The timer activation device 12 is coupled in parallel to a first contactor 18 and to one or more timers 14. Each timer preferably has means for adjusting its time delay period. Preferably, the adjustment means is a knob which allows the delay time period of the timer to be increased or decreased upon the discretion of a user. The mechanical timers used are robust, economical and readily available, such as Time Delay Relay CNS-35-72, available from Siemens Electromechanical Components, Poter and Broomfield Div. Solid state timers may also be used. The time delay outputs of timers 14 are each connected to a respective contactor 28. The first contactor 18 closes its associated circuits 32 and the time delay period for all timers is begun simultaneously when timer activation device 12 is enabled. When the delay time has elapsed for a particular timer, its output is energized and the contactor 28 connected to that output closes the associated circuit(s) 32, powering the attached devices. In a preferred embodiment, the circuits are lighting circuits and the time delays of the devices are set to sequentially activate different lighting circuits. Typical delay times are 0 to 100 minutes. As an example, a gas station with 20 circuits dedicated to HID lighting might take 30 minutes to become fully illuminated.

Contactor 18 and contactors 28 are also preferably connected to respective pilot lights 30. Model number CR104PLG22R pilot light, supplied by General Electric Co. is an example of a pilot light which may be used in the controller of the invention. The function of the pilot light(s) is to indicate that the timing sequence has begun and which circuits have been energized. The pilot lights may also be connected to the outputs of timers 14 rather than to contactors 28.

All electrical installations should meet the requirements of the applicable electrical code. In the United States, this is the National Electrical Code. For example, requirements as to number of circuits associated with the controller and allowable loads should be complied with. Requirements as to wire spacing and bending room determine the dimensions of the housing. In addition, certain sections of the Code which deal with installations in gas stations may be applicable.

The present invention thus provides a significant savings of electricity costs by avoiding the cumulative power draw which would occur if all circuits were activated simultaneously or nearly simultaneously. This is particularly important where the circuits are for high intensity discharge lighting, for example. The invention provides a further savings of electricity costs by preventing unintentional operation of the devices connected to the controller because of human error.

As will be appreciated by those skilled in the art, the number of timers and contactors may vary, within the limitations set by the applicable electrical code. For the timer activation device, a photocell could comprise any light or radiant energy sensing device or circuit.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A time delay power controller for use in controlling a plurality of high intensity discharge lamps, said controller comprising:

a power input for receiving alternating electrical power from an external source;

a timer activation device connected in parallel to one or more timers, each timer having an associated delay time and an output for delivering power after the delay time has elapsed; and a plurality of contactors, with a first contactor of said plurality of contactors coupled to the timer activation device and each remaining contactor coupled to the output of a respective one of said timers and each contactor coupled to one or more associated high intensity discharge lighting circuits, the first contactor allowing delivery of alternating electrical power to its associated high intensity discharge lighting circuits when the timer activation device is enabled and each remaining contactor allowing delivery of alternating electrical power to its associated high intensity discharge lighting circuit when the delay time of the respective one of the timers has elapsed.

2. The power controller of claim 1, wherein the one or more timers and the plurality of contactors are enclosed in a housing.

3. The power controller of claim 2, wherein the housing is weather resistant.

4. The power controller of claim 1, further comprising a mode selector coupled between the power input and the timer activation device.

5. The power controller of claim 4, further comprising an override relay connected to the mode selector and to each contactor.

6. The power controller of claim 5, wherein the one or more timers, the plurality of contactors, the mode selector, the override relay, and the timer activation device are enclosed in a common housing.

7. The power controller of claim 1, wherein the timer activation device comprises a photocell.

8. The power controller of claim 1, wherein the timer activation device comprises a switch.

9. The power controller of claim 1, wherein the timer activation device includes a further timer, having a turn-off delay time.

10. The power controller of claim 1, wherein each timer has means for adjusting the associated delay time.

11. The power controller of claim 1, further comprising a plurality of pilot lights associated respectively with the first contactor and with each timer, the first contactor allowing delivery of alternating electrical power to its associated pilot light when the timer activation device is enabled, and each timer allowing delivery of alternating electrical power to its associated pilot light when the delay time of the respective one of the timers has elapsed.

12. The power controller of claim 1, wherein the associated time delay of each timer is of different duration.

13. The power controller of claim 12, further comprising a mode selector coupled between the power input and the timer activation device, and override relay connected to the mode selector and to each contactor; and wherein the multiple timers, the plurality of contactors, the mode selector, the override relay and the timer activation device are enclosed in a common housing.

14. The power controller of claim 13, further comprising a respective pilot light associated with the first contactor and with each timer, the first contactor allowing delivery of alternating electrical power to its associated pilot light when the timer activation device is enabled, and each timer allowing delivery of alternating electrical power to its associated pilot light when the associated delay time has elapsed.

15. A method for activating a plurality of outdoor security lighting circuits in a non-simultaneous manner, said method comprising:

(a) supplying alternating electrical power from an external source to a time delay power controller;

(b) enabling a timer activation device connected in parallel to a first contactor and to one or more timers, each timer having an associated delay time and an output for delivering power after the delay time has elapsed;

(c) initiating said associated delay time upon enabling each timer; and (d) delivering alternating electrical power to one or more high intensity discharge lighting circuits coupled to the output of each timer when the delay time of each timer has elapsed.

16. The method of claim 15, wherein the timer activation device comprises a photocell.

17. The method of claim 15, wherein the timer activation device comprises a switch.

18. The method of claim 15, wherein the timer activation device is connected to a further timer, having a turn-off delay time, and said turn-off delay time is initiated by enabling said further timer, the method comprising an additional step of discontinuing delivery of alternating electrical power to said one or more high intensity discharge lighting circuits when the turn-off delay time of said further timer has elapsed.

* * * * *